(12) United States Patent
Westhues et al.

(10) Patent No.: US 12,481,680 B2
(45) Date of Patent: Nov. 25, 2025

(54) TEAM DATA CLUSTERING AS A SERVICE

(71) Applicant: State Farm Mutual Automobile Insurance Company, Bloomington, IL (US)

(72) Inventors: John Westhues, Normal, IL (US); Dustin Meyer, Bloomington, IL (US); Dan Boser, Bloomington, IL (US); Dee Engel, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/649,523

(22) Filed: Apr. 29, 2024

(65) Prior Publication Data

US 2024/0378221 A1 Nov. 14, 2024

Related U.S. Application Data

(60) Provisional application No. 63/465,440, filed on May 10, 2023.

(51) Int. Cl.
*G06F 16/00* (2019.01)
*G06F 16/25* (2019.01)
*G06F 16/28* (2019.01)
*G06F 16/29* (2019.01)

(52) U.S. Cl.
CPC .......... *G06F 16/287* (2019.01); *G06F 16/256* (2019.01); *G06F 16/29* (2019.01)

(58) Field of Classification Search
CPC ....... G06F 16/287; G06F 16/256; G06F 16/29
See application file for complete search history.

(56) References Cited

U.S. PATENT DOCUMENTS

| 2019/0018709 | A1* | 1/2019 | Becker | G06F 9/5038 |
| 2022/0374397 | A1* | 11/2022 | Wong | G06F 16/2456 |
| 2022/0385532 | A1* | 12/2022 | Erez | H04L 41/0816 |
| 2023/0351194 | A1* | 11/2023 | Wright | G06F 16/285 |
| 2023/0351416 | A1* | 11/2023 | Green | G06Q 30/0204 |

* cited by examiner

*Primary Examiner* — Dinku W Gebresenbet
(74) *Attorney, Agent, or Firm* — Lee & Hayes, P.C.

(57) ABSTRACT

Techniques relating to clustering team data and providing the resulting cluster information as a service. The cluster information provided as a service can be efficiently incorporated into tools and services of utility for the teams from which the team data is gathered.

20 Claims, 8 Drawing Sheets

TEAM DATA CLUSTERING AS A SERVICE

CROSS REFERENCE TO RELATED APPLICATIONS

This application claims priority to U.S. Provisional Patent Application No. 63/465,440, filed May 10, 2023, the entire contents of which are incorporated herein by reference.

BACKGROUND

Clustering, as the term is used herein, refers to the task of grouping a set of objects in such a way that objects in a group (referred to as a cluster) are more similar to each other than to objects in other clusters. Clustering can be achieved by applying, to object data, any of a variety of computerized clustering techniques. Clustering techniques can differ, for example, in their definitions of what constitutes a cluster and how to efficiently identify clusters.

Clustering techniques and parameter settings therefor, such as distance functions, density thresholds, and the number of expected output clusters, can depend on the data set to be clustered as well as the desired output. Different clustering techniques can be usefully applied in a wide variety of disciplines, e.g., biology, geophysics, psychology, economics, and any other disciplines in which large amounts of data may be collected. In each discipline, different clustering techniques and parameters may be discovered to be useful for different purposes.

For instance, large organizations may possess quantities of data pertaining to different teams working for or with the organization. Team data can include, for example, a wide variety of data about team members, the activities of the team members, the environmental, economic, or other conditions in which different teams operate, and results achieved by different teams. However, the sheer volume of the team data can be difficult to organize, interpret or utilize, thereby resulting in difficulties for the organization to utilize the team data in an effective manner.

Accordingly, there is a need for the clustering techniques and corresponding uses of the resulting clusters, to allow organizations to efficiently derive value from collected team data.

SUMMARY

To address the need for more effective application of clustering technologies in the context of team data, this disclosure describes various systems and techniques to cluster team data and provide the resulting cluster information as a service, so that the resulting cluster information can be efficiently incorporated into an organization's tools and services, thereby enabling generating tools and services that are customized to suit the needs of teams in different clusters.

In an example of the present disclosure, an example method can comprise clustering team data and making the resulting clustered data available via an application programming interface (API). Example operations can include clustering, by one or more computing devices, team data in order to identify multiple different team clusters, wherein the team data comprises multiple different variables applicable to multiple different teams, wherein the clustering uses a machine learning based clustering technique, and wherein each of the multiple different team clusters identifies a different group of the multiple different teams; storing, by the one or more computing devices, the multiple different team clusters in a storage location that is accessible via an API; receiving, by the one or more computing devices, an API request via the API, wherein the API request comprises a team identification that identifies a team of the multiple different teams; identifying, by the one or more computing devices, in response to the API request, a team cluster of the multiple different team clusters, wherein the team cluster comprises the team identification; and returning, by the one or more computing devices, in response to the API request, an API response comprising a team cluster identification of the team cluster.

In another example of the present disclosure, an example system is provided comprising one or more computing devices. The system can comprise one or more processors and one or more non-transitory computer-readable media storing computer-executable instructions that, when executed by the one or more processors, cause the one or more processors to perform operations. The operations can comprise, for example, clustering team data in order to identify multiple different team clusters, wherein the team data comprises multiple different variables applicable to multiple different teams, wherein the clustering uses a machine learning based clustering technique, and wherein each of the multiple different team clusters identifies a different group of the multiple different teams; storing the multiple different team clusters in a storage location that is accessible via an API; receiving an API request via the API, wherein the API request comprises a team cluster identification that identifies a team cluster of the multiple different team clusters; identifying, in response to the API request, team identifications of teams in a group of the multiple different teams associated with the team cluster; and returning, by the one or more computing devices, in response to the API request, an API response comprising the team identifications of the teams in the group of the multiple different teams associated with the team cluster.

In yet another example of the present disclosure, one or more non-transitory computer-readable media are provided, the non-transitory computer-readable media storing instructions executable by a processor, wherein the instructions, when executed by the processor, cause the processor to perform operations comprising, for example, clustering team data in order to identify multiple different team clusters, wherein the team data comprises multiple different variables applicable to multiple different teams, wherein the clustering uses a machine learning based clustering technique, and wherein each of the multiple different team clusters identifies a different group of the multiple different teams; storing the multiple different team clusters in a storage location; generating, based on the multiple different team clusters in the storage location, cluster visualization data for displaying a visual representation of the multiple different team clusters; and displaying the cluster visualization data via a cluster visualization dashboard.

Another embodiment of the present disclosure includes a system for providing team data for clusters, the system comprising: means for using a machine learning based clustering technique to cluster the team data in order to identify multiple different team clusters, wherein the team data comprises multiple different variables applicable to multiple different teams, and wherein each team cluster of the multiple different team clusters comprises a different group of the multiple different teams; means for storing the multiple different team clusters in a storage location; means for generating, based on the multiple different team clusters in the storage location, cluster visualization data that enables a visual representation of the multiple different team clusters; and means for displaying the cluster visualization data via a cluster visualization dashboard.

Further aspects and embodiments of the present disclosure are described in detail below.

DETAILED DESCRIPTION

Figure 1:
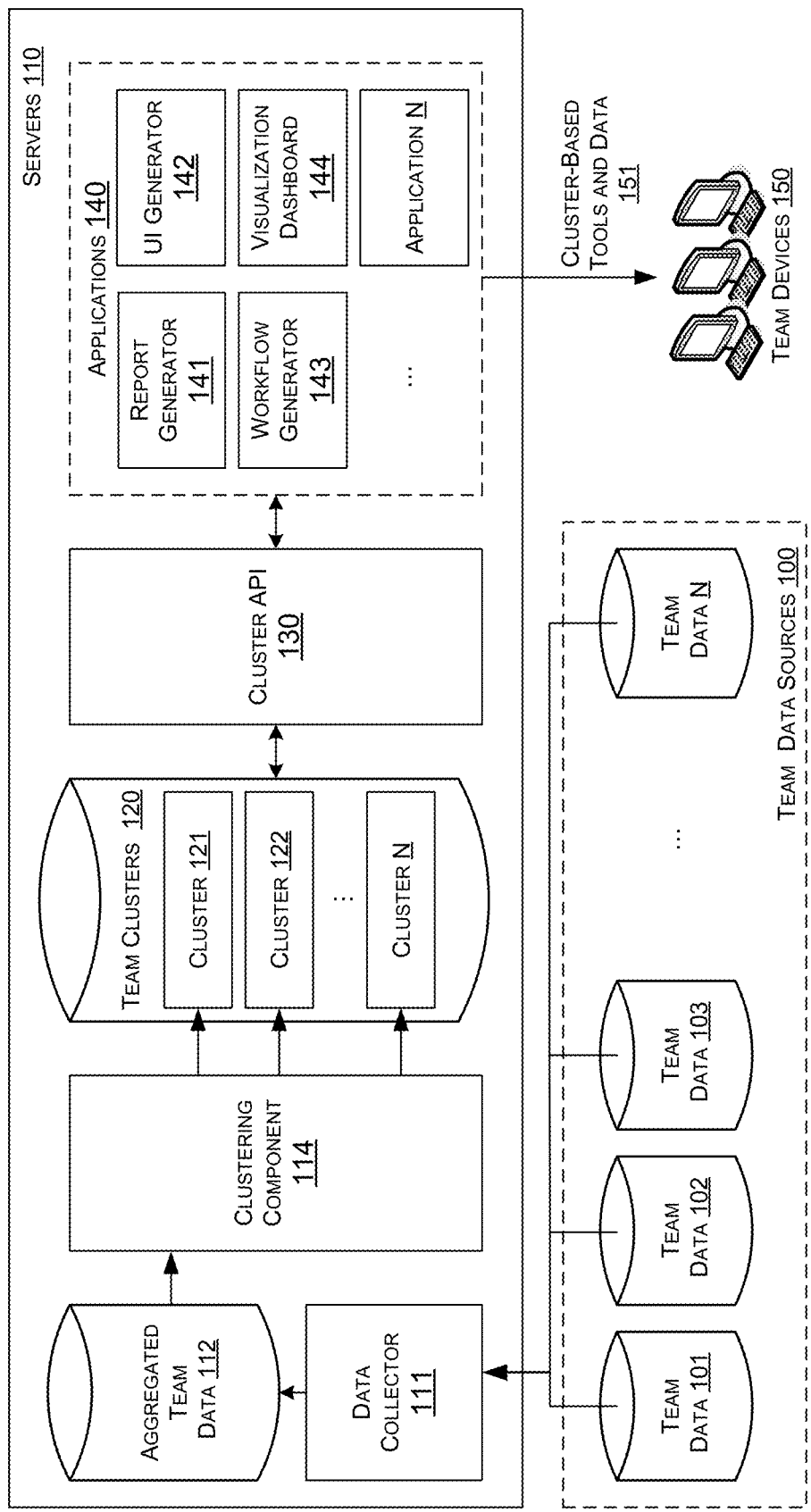
FIG. 1 illustrates example servers equipped to collect and aggregate team data, to cluster the team data, and to provide the resulting team cluster information via an application programming interface (API) that is accessible by applications to generate cluster-based tools and data, in accordance with one or more examples of the present disclosure.

FIG. 1 illustrates example servers equipped to collect and aggregate team data, to cluster the team data, and to provide the resulting team cluster information via an application programming interface (API) that is accessible by applications to generate cluster-based tools and data, in accordance with one or more examples of the present disclosure. FIG. 1 includes example team data sources 100, example servers 110, and example team devices 150. The servers 110 can be configured to cluster team data collected from the team data sources 100, and to supply cluster-based tools and data 151 to the team devices 150.

While techniques described herein relate to clustering of agent offices in an insurance environment, such techniques can be similarly appliable to any environment, industry, or the like where grouping of teams, users, or the like may be applicable. That is, techniques described herein are not limited to agent offices and may be applied to any type of environment.

The team data sources 100 can comprise a variety of different stored team data, e.g., team data 101, team data 102, team data 103, . . . team data N. In some embodiments, the different stored team data 101, 102, 103, . . . team data N can correspond to different teams, e.g., the stored team data 101 can comprise team data for a team "A", the stored team data 102 can comprise team data for a team "B", the stored team data 103 can comprise team data for a team "C", etc. In other embodiments, the different stored team data 101, 102, 103, . . . team data N can correspond to different data sources, which each data source having different types of data applicable to multiple different teams. For instance, data sources may correspond to data stored in one or more system(s) (e.g., on premise systems, cloud systems, third-party system(s) (e.g., geographic data, U.S. census data, U.S.P.S. zip codes, etc.), etc.), object(s), and/or table(s) of the separate system(s)). For example, the stored team data 101 can comprise activity data (e.g., data associated with activities of a particular team within an organization, such as sales data, product data, service data (e.g., servicing of a product), claim data, communication data, etc.) for multiple of the teams A, B, C, etc. The stored team data 102 can comprise team properties such as location information, team member information, total number of team members, etc., for multiple of the teams A, B, C, etc. The stored team data 103 can comprise any other data applicable to multiple of the teams A, B, C, etc.

The servers 110 can comprise a data collector 111, aggregated team data 112, clustering component 114, team clusters 120, cluster API 130 and applications 140. The team clusters 120 can comprise different clusters 121, 122, . . . cluster N. The applications 140 can comprise various different applications such as report generator 141, UI generator 142, workflow generator 143, visualization dashboard 144, . . . application N.

In an example according to FIG. 1, the data collector 111 can be configured to collect the team data 101, 102, 103, . . . team data N from the team data sources 100. The collected team data 101, 102, 103, . . . team data N can optionally be pre-processed and stored as aggregated team data 112. For instance, pre-processing may comprise utilizing a cloud-based system (e.g., Amazon Web Services, etc.), where the team data 101, 102, 103, . . . team data N is pre-processed using one or more processing tools (e.g., Lambda, EC2 Instances, Sagemaker, Python, etc.).

The clustering component 114 can apply a clustering technique (e.g., such as a K-means model, Dbscan, a tree-based hierarchy, OPTIC, etc.) with determined clustering parameters (e.g., such as a number of clusters, etc.) to the aggregated team data 112, in order to generate team clusters 120. In some examples, statistical techniques may be utilized in addition to the clustering techniques. Statistical techniques may include one or more of a silhouette coefficient, SHAP values, and/or any other customized process for ensuring model and/or data quality. The team clusters 120 can comprise, e.g., a cluster 121 comprising a first group of teams, a cluster 122 comprising a second group of teams that is different from the first group, and any additional clusters up to the cluster N comprising another group of teams that is different from the first group, the second group, and any other groups associated with other clusters. For instance, the cluster 121 may be different from cluster 122 based on behavioral data (e.g., how agents at a particular office interact with the system, how often a particular resource is accessed by agent(s) at a particular office, duration of time a particular process takes to complete at a particular office, process(es) utilized at a particular office, application(s) and/or widgets utilized at a particular office, types of office portfolio, types of templates utilized, etc.), operational data (e.g., counts of widget(s) a particular office utilizes, number of clicks associated with each interaction of a particular office, number of template(s) utilized at a particular office, number of agents at a particular office, number of virtual meetings, etc.), and/or demographic data (e.g., office age associated with a particular office, location of the particular office, population size associated with the location of the particular office). Any number of teams may be included as part of each cluster and any number of clusters may be used. For instance, the team clusters 120 may comprise 4 clusters or any number of suitable clusters.

Further, the first group of team in cluster 121 may differ from the second group of teams in cluster 122 based on one or more factors (e.g., number of agents at a particular office, office theme (e.g., sales focused, service focused, business acquisition focused, etc.), location of a particular office, population size associated with the location of the particular office, number of years a particular office has been operating, a ratio of virtual meetings created by a particular office to total virtual meetings across all offices, ratio of templates created by a particular office compared to total templates created across all offices, etc.). For example, the cluster 121 may comprise a group of 4 teams.

The data defining or identifying team clusters 120 can be stored in a format that is accessible by cluster API 130, and any of the various applications 140 can access the information associated with the team clusters 120 via the cluster API 130. In some examples, the cluster API 130 may support cluster identification requests to identify one of, multiple of, or all of the different clusters 121, 122, ... cluster N within the team clusters 120, and the cluster API 130 may be configured to generate and return lists of cluster identifications in response to cluster identification requests. In some examples, the cluster API 130 may support team identification requests to identify one of, multiple of, or all of the different teams within a specified cluster 121, 122, ... or cluster N, and the cluster API 130 may be configured to generate and return lists of team identifications in response to team identification requests. In further examples, the cluster API 130 may support requests to identify clusters associated with a specified cluster property, or teams within a cluster and having a specified team property. In this example, the cluster API 130 may be configured to return lists of clusters and/or team identifications that include the specified team property in response to the requests.

In an example use of the cluster API 130 by the applications 140, an application such as the report generator 141 can be configured to send a first API request to cluster API 130, to identify all of the clusters included in team clusters 120, and to optionally identify different properties associated with the different clusters included in team clusters 120. The cluster API 130 can be configured to return to report generator 141 a list of clusters and associated cluster properties included in team clusters 120.

The report generator 141 can be configured to use different groups of associated cluster properties, returned by the cluster API 130, to generate different report types. The different report types can be designed for use by teams within the different clusters. Report types may comprise one or more list(s), such as a business process prioritization lists (e.g., such as "beginning of day" activities) that is generated as an attachment. In some examples, the report types may be generated as a visualization that may be presented as part of a user interface (e.g., such as an effectiveness dashboards, operational dashboards, sales dashboards, services dashboards, etc.). In some examples, the visualization may be dynamic, such that a user may interact with the visualization to update and/or change the visualization in real-time. In some examples, the report types may be integrated as part of a visualization. For instance, the prioritization lists may be generated and displayed as part of a dashboard. Any type of dashboard, report, or visualization may be used and/or generated by the report generator 141. Further, the report types may be presented in a variety of different ways (e.g., as part of an attachment, dashboard, UI, or any other suitable format).

The report generator 141 can be configured to send a second API request to cluster API 130, to identify teams within a team cluster, e.g., identify teams within the cluster 121. The cluster API 130 can be configured to return to report generator 141 a list of teams within the specified cluster 121.

The report generator 141 can be configured to populate reports of the report type generated for the cluster 121 with team data for each team within the cluster 121. The report generator 141 can send resulting populated reports, as instances of cluster-based tools and data 151, to team devices 150. For example, the report generator 141 can be configured to send populated reports for teams within cluster 121 to a group of the team devices 150 that are associated with the cluster 121. In some examples, the report generator 141 may send the populated reports to each device in the group of the team devices 150 simultaneously. For instance, the populated reports may cause each device in the group of the team devices to display the populated report via a user interface of the team device.

Similar example uses of the cluster API 130 can be made by other applications 140. For example, an application such as the user interface (UI) generator 142 can be configured to send a first API request to cluster API 130, to identify all of the clusters included in team clusters 120, and to optionally identify different properties associated with the different clusters included in team clusters 120. The cluster API 130 can be configured to return to UI generator 142 a list of clusters and associated cluster properties included in team clusters 120.

The UI generator 142 can be configured to use different groups of associated cluster properties, returned by the cluster API 130, to generate different UI types. The different UI types can be designed for use by teams within the different clusters. For instance, the UI types may be customized to include features specific to individual clusters. As an example, the UI types may comprise a sales UI corresponding to a cluster associated with sales, a service UI corresponding to a service cluster, a catastrophe UI corresponding to a cluster of offices associated with handling catastrophes, etc.). The UI generator 142 can be configured to send a second API request to cluster API 130, to identify teams within a team cluster, e.g., identify teams within the cluster 121. The cluster API 130 can be configured to extract and return to UI generator 142 a list of teams within the specified cluster 121.

The UI generator 142 can be configured provide UIs of the different UI types, as instances of cluster-based tools and data 151, to team devices 150. For example, the UI generator 142 can be configured to provide a first UI type to a group of the team devices 150 that are associated with the cluster 121, while the UI generator 142 can be configured to provide a second UI type to a group of the team devices 150 that are associated with the cluster 122.

Further example uses of the cluster API 130 by applications 140 to generate cluster-based tools and data 151 for use by team devices 150 can be made with the benefit of this disclosure, and this disclosure is not limited to the example uses or sequences of API requests and responses set forth herein. A visualization dashboard 144 can be included among the applications 140 in some embodiments. In other embodiments, the visualization dashboard 144 can be implemented separately from applications, as discussed further herein.

In an example application of the technologies disclosed herein, data collected by an insurance company can be used to identify clusters of insurance agent teams, wherein different insurance agent teams are associated with different agent offices. For example, an insurance company may work with thousands of different agent offices which are geographically distributed, e.g., across the United States. The different agent offices may exhibit different behaviors and activities, and different performance, under different local conditions. The insurance company may collect team data that reflects the agent offices' activities, performance, and local conditions. The technologies described herein can be configured to use the collected team data to cluster the agent offices, and to provide different cluster-based tools and data to different agent offices included in different agent office clusters.

The clustering technologies disclosed herein can generate clustering models to be used for differentiated business processes to help maximize procedural impact for agent office teams and the technology developers that develop, e.g., UIs, workflows, and other tools for the agent office teams. In some examples, tools for the agent office teams can help promote customization with respect to different clusters. For instance, the tools may promote and/or recommend different activity priorities for agent office teams in different clusters, recommend different next actions for agent office teams in different clusters, provide different custom UIs for agent office teams in different clusters, provide different targeted coaching for agent office teams in different clusters, and provide different nuanced analytics and reporting for agent office teams in different clusters.

Agent office teams differ in how they prioritize and manage their business. Therefore, one size fits all sales and service channel solutions are not optimal. For example, one size fits all sales and service channel solutions can create problems for agent office teams who are trying to customize solutions for their customer base. One size fits all sales and service channel solutions can also present challenges to technology developers who struggle to meet the needs of a variable agent office team force.

The disclosed team data clustering service can allow customization of aspects of sales and service workflows to better match agent office team business behaviors. Clustering can be conducted using, at least in part, customer relationship management (CRM) data, such as electronic customer relationship management (ECRM) data associated with different agent office teams. For example, a clustering component 114 can be configured to evaluate behavior patterns of agent office teams and their staff using machine learning and unsupervised modeling techniques. Records generated through ECRM workflows can supply the aggregated team data 112 that allow the clustering component 114 to group agent office teams by common characteristics (e.g., such as workflow focus, communication methods utilized, sales focused or service focused, process utilization (e.g., for every business process (e.g., adding a driver to a policy), measuring how long the process takes, etc.), office characteristics associated with each office team, office demographics (e.g., number of agents within a particular office, processes utilized, key strokes associated with application(s) accessed, population density associated with a particular location of an office, etc.)) . . . . Clustering component 114 outputs, e.g., team clusters 120, can then be made available to applications 140 developed by enterprise customers (product teams, sales leaders, programmers, etc.), allowing the enterprise customers to create differentiated workflows through the cluster API 130 and/or writing outcomes back into an ECRM object.

Some ECRM data that can be advantageously used as clustering characteristics includes service management data, community characteristics data, work distribution data, business planning data, office size data, sales method data, and opportunity data such as opportunities available to each team, opportunity channels associated with the opportunities, and opportunity ages associated with the opportunities. An example opportunity may comprise, e.g., an inquiry regarding automobile insurance received via an email channel, which is 5 days old. Some example clusters that can be formed by clustering ECRM data include, e.g., an automobile focused, traditional sales cluster, an automobile focused, digital sales cluster, and a multiline focused, traditional sales cluster.

The clustering component 114 can be configured to use any of a variety of different clustering techniques to form team clusters 120 based on the aggregated team data 112. In some embodiments, the clustering component 114 can apply machine learning which is configured to use a centroid-based clustering technique, such as a k-means clustering technique.

K-means clustering techniques can comprise unsupervised modeling methods that make inferences to outcomes without referring to known or defined outcome labels. K-means can provide the ability to allow business knowledge to influence cluster count before running the model. This is unlike other clustering methods which tend to dictate the number of clusters. An example K-means model can be structured as follows: First, the variables employed can be derived from a large volume of unrelated business processes. Finding clusters from these diverse data sets can be discovered through machine learning techniques such as K-means. Second, a standardscalar ( ) function can be used to establish similar weighting and to ensure individual variables don't dominate their counterparts. Third, median values can be primarily leveraged to avoid the impact of extreme values. Fourth, silhouette coefficients can be used to validate the model outputs and ensure consistency across executions.

The clustering component 114 can optionally be configured to use a multi-stage process to generate team clusters 120. First, the clustering component 114 can generate an initial set of team clusters. Next, the clustering component 114 can refine the initial set of team clusters, resulting in refined clusters. Next, the clustering component 114 can further process the refined clusters to generate micro-clusters. The micro-clusters and/or the refined clusters can be stored in team clusters 120 as clusters 121, 122, . . . cluster N, wherein cluster data from clusters 121, 122, . . . cluster N is exposed as a service via the cluster API 130.

Some example cluster-based tools and data that can be provided to the different clusters includes beginning of day prioritization data. The automobile focused, traditional sales cluster can be provided with first beginning of day prioritization data that directs the first cluster to a first information source, e.g., a first website that promotes sales lead generation. The automobile focused, digital sales cluster can be provided with second beginning of day prioritization data that directs the second cluster to a second information source, e.g., a second website that promotes sales lead follow up. The multiline focused, traditional sales cluster can be provided with third beginning of day prioritization data that directs the third cluster to a third information source, e.g., a third website that promotes servicing existing customers.

Further example cluster-based tools and data that can be provided to the different clusters includes cluster-based UIs. The automobile focused, traditional sales cluster can be provided with a first UI configured to promote follow up on missed calls. The automobile focused, digital sales cluster can be provided with a second UI configured to promote sales channel activities. The multiline focused, traditional sales cluster can be provided with a third UI configured to promote customer retention activities.

The applications 140 can include any application, including the examples illustrated in FIG. 1 as well as further applications that may be developed with the benefit of this disclosure. Applications to include in applications 140 can include, e.g., analytics applications, differentiated workflow applications, and modelling applications. Analytics applications can comprise, for example, cluster-based inferential analysis features, cluster-based descriptive analysis features, cluster-based reporting and dashboards, and cluster-based adoption analytics features. Differentiated workflow applications can comprise, for example, cluster-based input elements for inclusion in UIs, and cluster-based input elements for inclusion in workflows. Modelling applications can comprise, for example, cluster-based inputs for inclusion in models and cluster-based targeted population identification features.

In summary, with reference to FIG. 1, team data can be aggregated and clustered, and the resulting cluster information can be stored and made available as a service to applications that can use the cluster information to build cluster-based tools and information. Accordingly, by intelligently clustering team data, the techniques described herein can utilize data that, due to the volume of data, has been too difficult for a network to organize, much less use, in order to build customized tools and user interfaces for teams within cluster(s). Thus, the techniques provide a way to efficiently organize and store large volumes of data, thereby improving network efficiency by reducing the amount of resources required to process, organize, etc. the data.

Figure 2:
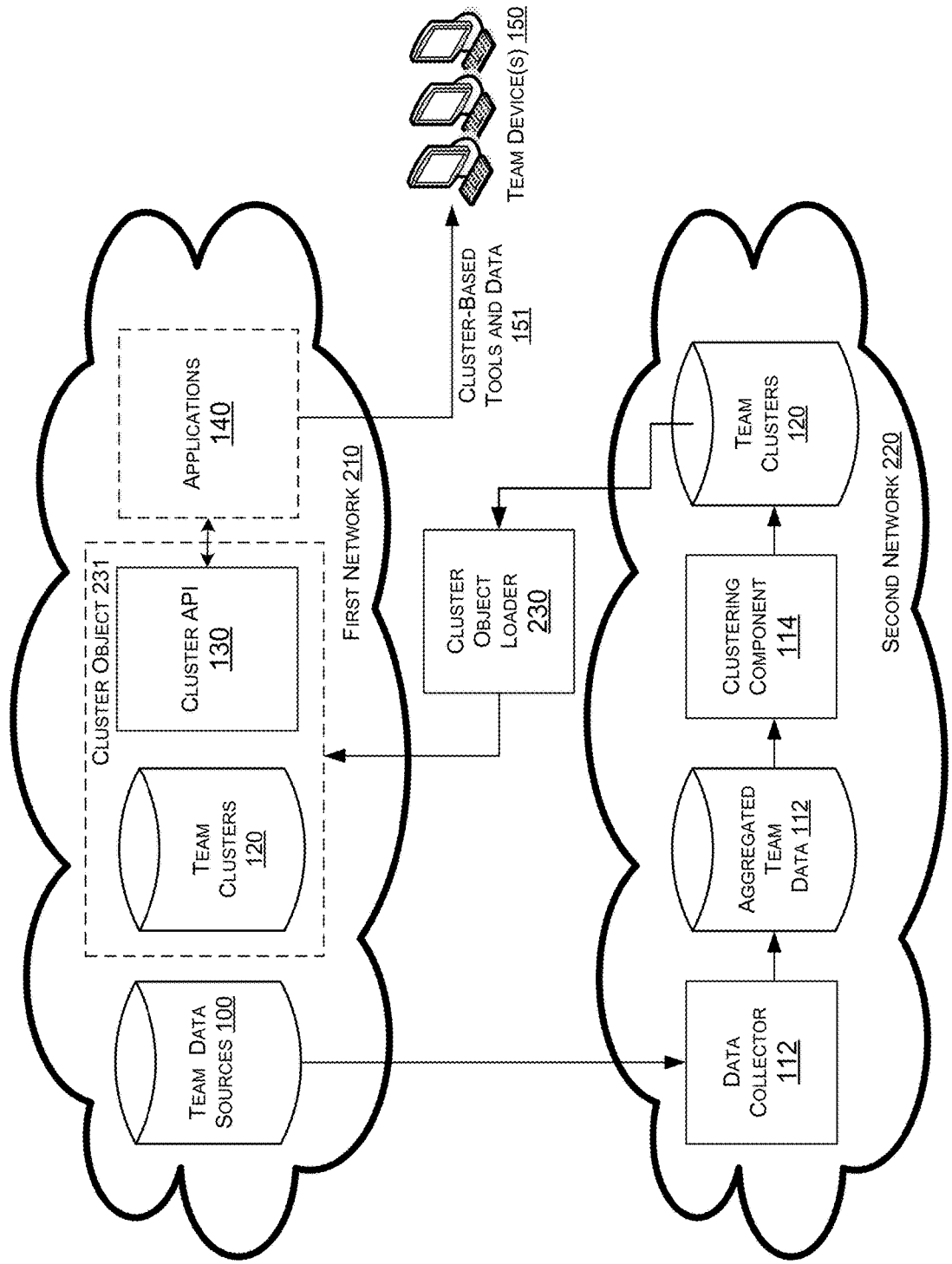
FIG. 2 illustrates an example arrangement including a first network and a second network that are configured to cooperate to cluster team data and provide the resulting team clusters via an API, in accordance with one or more examples of the present disclosure.

FIG. 2 illustrates an example arrangement including a first network and a second network that are configured to cooperate to cluster team data and provide the resulting team clusters via an API, in accordance with one or more examples of the present disclosure. FIG. 2 illustrates a first network 210, a second network 220, and a cluster object loader 230. Elements included in the servers 110 introduced in FIG. 1 are divided between the first network 210 and the second network 220. The first network 210 comprises the team data sources 100, a cluster object 231 comprising the team clusters 120 and the cluster API 130, and the applications 140. The second network 220 comprises the data collector 111, the aggregated team data 112, the clustering component 114, and the team clusters 120.

In an example according to FIG. 2, cluster generation is generally implemented via the second network 220, while the resulting team clusters 120 are placed at the first network 210 in support of the cluster API 130 at the first network 210.

For example, the data collector 111 at the second network 220 can collect team data from team data sources 100 accessible via the first network 210. The data collector 111 at the second network 220 can store aggregated team data 112 at the second network 220, the aggregated team data 112 comprising data from the team data sources 100. The clustering component can use the aggregated team data 112 to identify team clusters 120, e.g., a plurality of different clusters, each cluster comprising a different group of teams.

The cluster object loader 230 can reside at the first network 210, the second network, or for example at on-premises equipment that is separate from the first network and the second network 220. The cluster object loader 230 can bundle the team clusters 120 with the cluster API 130 to generate the cluster object 231, and the cluster object loader 230 can load the cluster object 231 at the first network 210, thereby making the cluster object 231 available for use by applications 140 that execute in the first network 210 or otherwise are configured to access the first network 210. The applications 140 at the first network 210 can supply different cluster-based tools and data 151 to different team devices 150 that are communicatively coupled with the first network 210 but are not necessarily communicatively coupled with the second network 220.

In some embodiments, the first network 210 and the second network 220 can comprise equipment hosted by cloud service providers. For example, the first network 210 can be provided by a cloud service provider such as Salesforce, which is generally configured to support day-to-day business processes. The second network 220 can be provided by a cloud service provider such as Amazon Web Services, which is generally configured to support high computational and memory demands. The cluster object loader 230 can reside at on-premises equipment provided by the owner of the team data sources 100 and the clustering component 114.

In summary, with reference to FIG. 2, architectures according to this disclosure can pull team data from a first cloud or network infrastructure into a second cloud or network infrastructure. The clustering techniques can be applied within the second cloud infrastructure, and the resulting cluster information can then be stored and made available as a service within the first cloud infrastructure.

Figure 3:
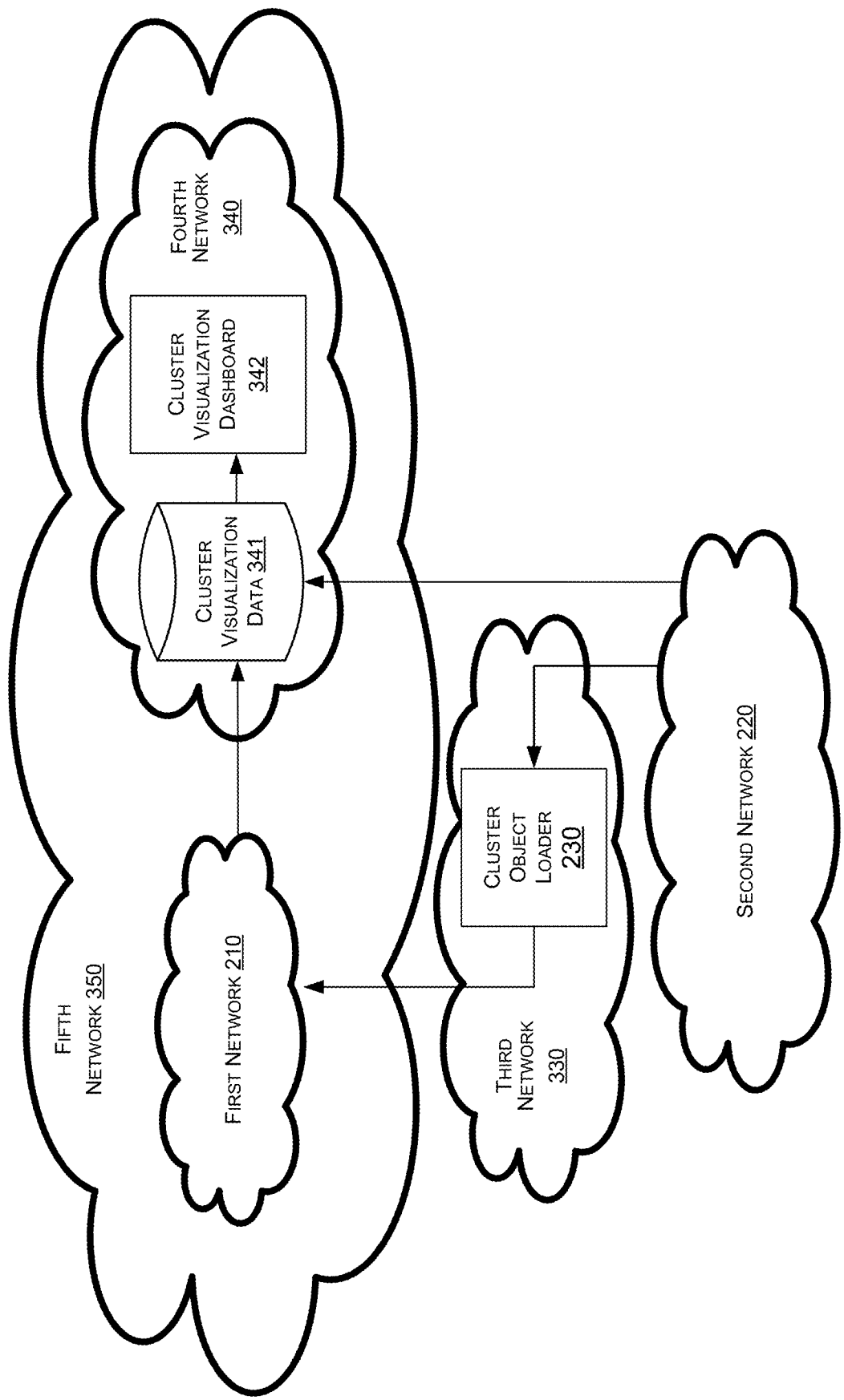
FIG. 3 illustrates an example arrangement including the first and second network introduced in FIG. 2, wherein the first and second networks are further configured to cooperate with a third, a fourth, and a fifth network to provide the team cluster data via an API as illustrated in FIG. 2 as well as to provide cluster visualization data and a cluster visualization dashboard via the illustrated fourth network, in accordance with one or more examples of the present disclosure.

FIG. 3 illustrates an example arrangement including the first and second network introduced in FIG. 2, wherein the first and second networks are further configured to cooperate with a third, fourth, and fifth network to provide the team cluster data via an API as illustrated in FIG. 2 as well as to provide cluster visualization data and a cluster visualization dashboard via the illustrated fourth network, in accordance with one or more examples of the present disclosure. In FIG. 3, a fifth network 350 comprises both the first network 210 introduced in FIG. 2, and a fourth network 340. The fourth network 340 comprises cluster visualization data 341 and a cluster visualization dashboard 342.

In FIG. 3, the cluster object loader 230 is illustrated within a third network 330. The first network 210, the second network 220, and the cluster object loader 230 can comprise the components illustrated in FIG. 2 and can operate as described in connection with FIG. 2.

Figure 8:
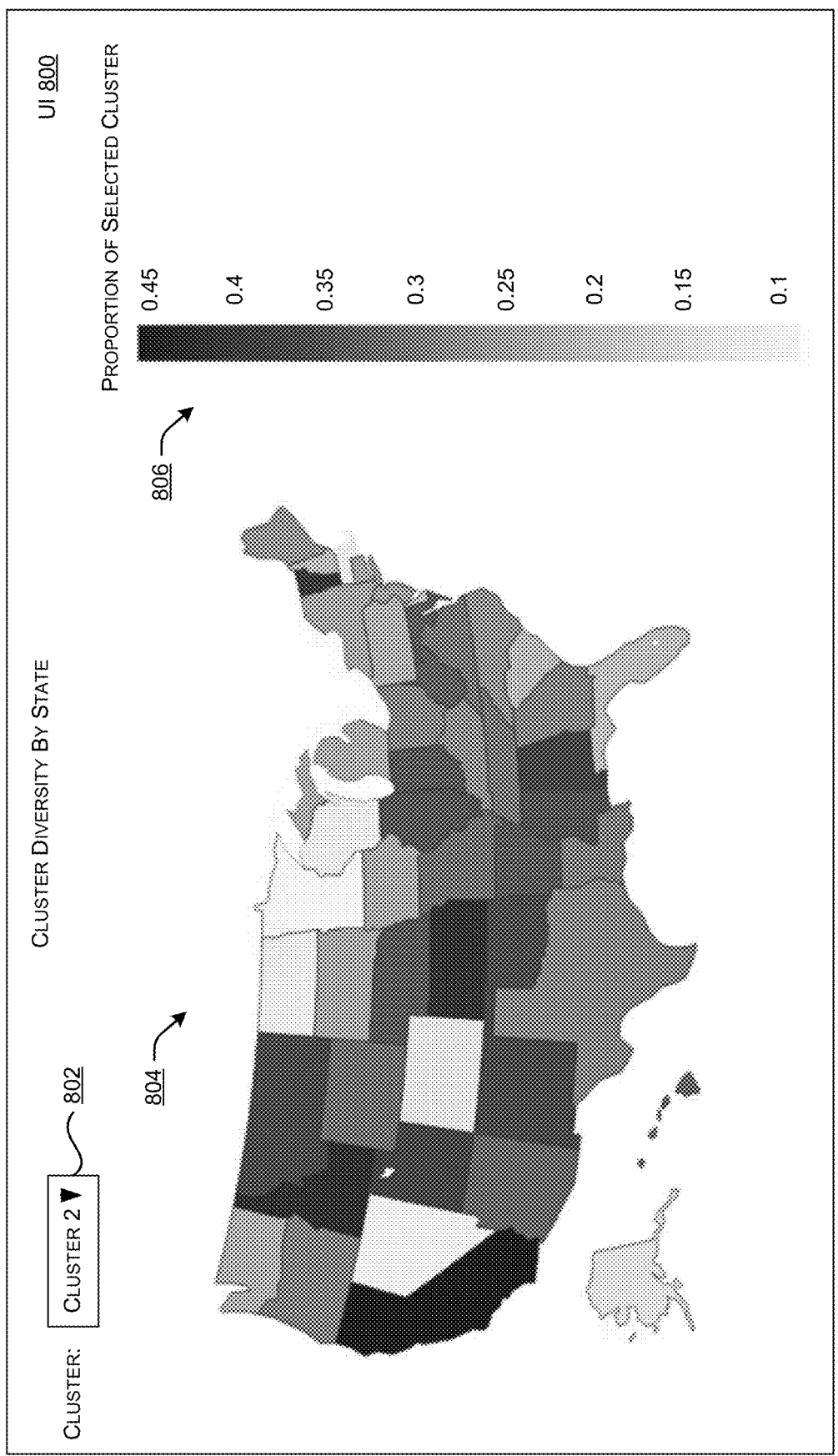
FIG. 8 illustrates an example user interface (UI) generated as part of a cluster visualization dashboard, in accordance with one or more examples of the present disclosure.

In an embodiment, the cluster visualization data 341 can be supplied to the fourth network 340 via the second network 220 as well as the first network 210. For example, the first network can supply the team clusters 120 to the fourth network 340, and the fourth network 340 can optionally organize or supplement the team clusters 120 with data retrieved via the cluster API 130, in order to generate the cluster visualization data 341. The cluster visualization dashboard 342 can be accessible by devices with access to the fourth network 340 and can be configured to provide any number of tools and representations to facilitate understanding of the team clusters 120 and properties thereof. One example UI that can be provided in connection with a cluster visualization dashboard 342 is illustrated in FIG. 8. with the understanding that other useful presentations of team clusters 120 can be made with the benefit of this disclosure.

In summary, with reference to FIG. 3, the first cloud or network infrastructure illustrated in FIG. 2 can comprise two sub-cloud or network infrastructures. The first sub-cloud or network infrastructure can support providing cluster information as a service while the second sub-cloud or network infrastructure can support cluster visualization.

Figure 4:
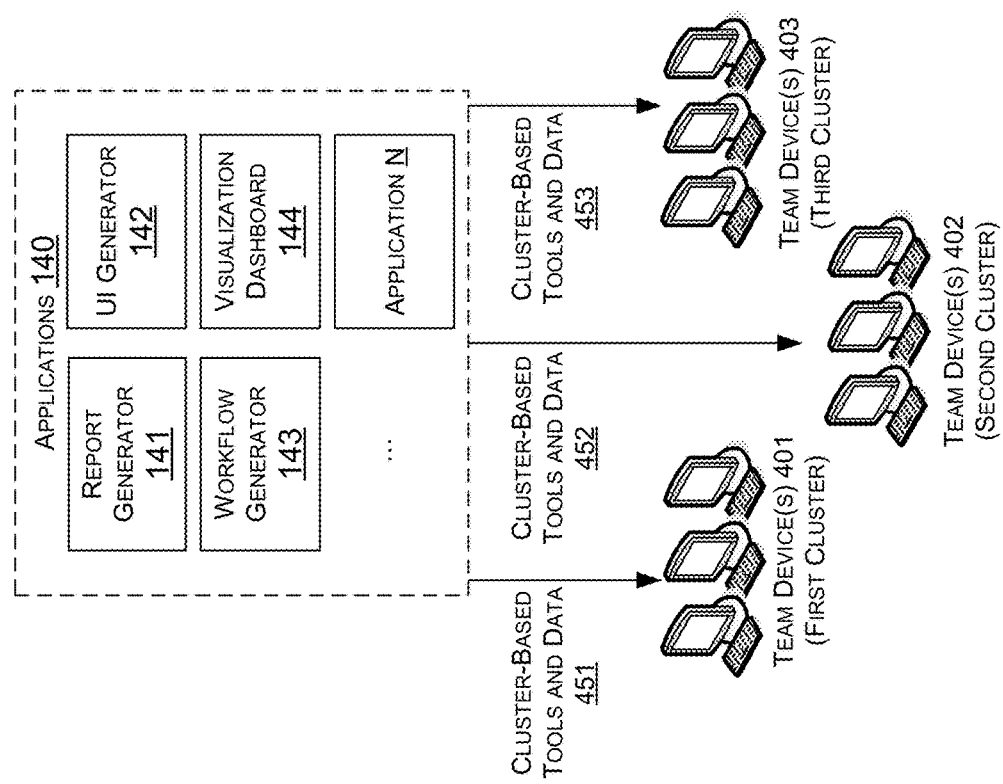
FIG. 4 illustrates example operations of the applications introduced in FIG. 1 to provide different cluster-based tools and data to different team devices, depending on which cluster the team devices are associated with, in accordance with one or more examples of the present disclosure.

FIG. 4 illustrates example operations of the applications introduced in FIG. 1 to provide different cluster-based tools and data to different team devices, depending on which cluster the team devices are associated with, in accordance with one or more examples of the present disclosure. FIG. 4 comprises the applications 140 introduced in FIG. 1, namely report generator 141, UI generator 142, workflow generator 143, visualization dashboard 144, and application N. FIG. 4 further comprises three example groups of team devices, with the understanding that more or fewer groups of team devices can be included in other embodiments. A first group of team devices 401 can include devices associated with teams that are included in a first cluster. A second group of team devices 402 can include devices associated with teams that are included in a second cluster. A third group of team devices 403 can include devices associated with teams that are included in a third cluster.

Any of the applications 140 can be configured to provide different cluster-based tools and data to different groups of team devices. For example, the application N can provide cluster-based tools and data 451 to the first group of team devices 401, the application N can provide cluster-based tools and data 452 to the second group of team devices 402, and the application N can provide cluster-based tools and data 453 to the third group of team devices 403. The cluster-based tools and data 451, 452, and 453 can be different from one another (e.g., each may include one or more different cluster-based tools, etc.). For instance, the cluster-based tools and data 451, 452, and 453 can be customized and designed to suit the needs of each of the teams within the first cluster, second cluster, and third cluster, respectively. For example, cluster-based tools and data 451 can comprise a first UI with a first group of UI elements, cluster-based tools, etc. customized for teams in a first cluster. Data 452 can comprise a second UI with a second group of UI elements that are customized for teams in a second cluster. Cluster-based tools and data 453 can comprise a third UI with a third group of UI elements customized for teams in a third cluster. The cluster-based tools and data 451, 452, and 453 can be customized based on operational data, utilization data, office demographics, properties, etc. associated with each of first cluster, second cluster, and/or third cluster.

In summary, with reference to FIG. 4, different applications can each be configured to use the cluster information as a service API disclosed herein to build different, customized versions of cluster-based tools and data, wherein the different versions may be configured for use by the teams that are included in the different clusters.

Figure 5:
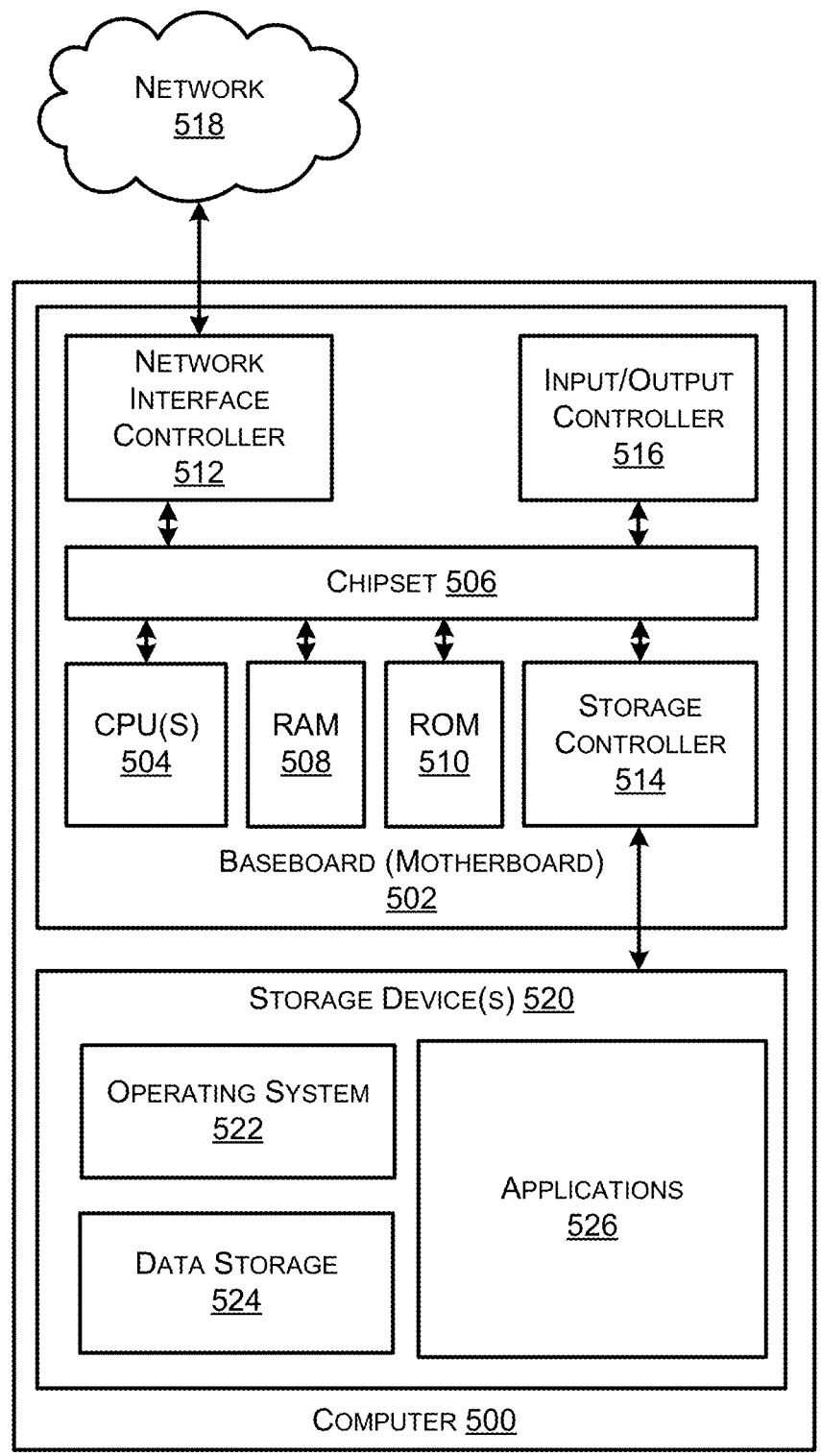
FIG. 5 is an example architecture for computing equipment capable of executing program components for implementing various techniques described herein.

FIG. 5 is an example architecture for computing equipment capable of executing program components for implementing various techniques described herein. The computer architecture shown in FIG. 5 may correspond to the systems and components of a server computer, workstation, desktop computer, laptop, tablet, network appliance, mobile device (e.g., tablet computer, smartphone, etc.), or other computing device, and can execute any of the software components described herein. The computer 500 may, in some examples, correspond to any of the computing systems or devices described above, such as the devices in the first network 210, second network 220, third network 330, fourth network 340, or fifth network 350, the team devices 150, and/or any other computing devices described herein. It will be appreciated that in various examples described herein, a computer 500 might not include all of the components shown in FIG. 5, can include additional components that are not explicitly shown in FIG. 5, and/or may utilize a different architecture from that shown in FIG. 5.

The computer 500 includes a baseboard 502, or "motherboard," which may be a printed circuit board to which a multitude of components or devices are connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a ROM 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 518, which may be similar or identical to the network(s) 206 discussed above. The chipset 506 also may include functionality for providing network connectivity through a Network Interface Controller (NIC) 512, such as a gigabit Ethernet adapter. The NIC 512 is capable of connecting the computer 500 to other computing devices over the network 518. It should be appreciated that multiple NICs 512 can be present in the computer 500, connecting the computer to other types of networks and remote computer systems. In some instances, the NICs 512 may include at least on ingress port and/or at least one egress port.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device.

The computer 500 can include one or more storage device(s) 520, which may be connected to and/or integrated within the computer 500, that provide non-volatile storage for the computer 500. The storage device(s) 520 can store an operating system 522, data storage systems 524, and/or applications 526, which are described in more detail herein. The storage device(s) 520 can be connected to the computer 500 through a storage controller 514 connected to the chipset 506. The storage device(s) 520 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device(s) 520 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 520 are characterized as primary or secondary storage, and the like.

For example, the computer 500 can store information to the storage device(s) 520 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device(s) 520 by detecting the physical states or characteristics of one or more particular locations within the physical storage units.

In addition to the storage device(s) 520 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the various operations performed by a computing system may be supported by one or more devices similar to computer 500. Stated otherwise, some or all of the operations described herein may be performed by one or more computers 500 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 520 can store an operating system 522 utilized to control the operation of the computer 500. In some examples, the operating system 522 comprises a LINUX operating system. In other examples, the operating system 522 comprises a WINDOWS® SERVER operating system from MICROSOFT Corporation of Redmond, Washington. In further examples, the operating system 522 can comprise a UNIX operating system or one of its variants. It should be appreciated that other operating systems can also be utilized. The storage device(s) 520 can store other system or application programs and data utilized by the computer 500.

In various examples, the storage device(s) 520 or other computer-readable storage media is encoded with computer-executable instructions which, when loaded into the computer 500, transform the computer from a general-purpose computing system into a special-purpose computer capable of implementing various techniques described herein. These computer-executable instructions transform the computer 500 by specifying how the CPUs 504 transition between states, as described above. In some examples, the computer 500 may have access to computer-readable storage media storing computer-executable instructions which, when executed by the computer 500, perform the various techniques described herein. The computer 500 can also include computer-readable storage media having instructions stored thereupon for performing any of the other computer-implemented operations described herein.

As illustrated in FIG. 5, the storage device(s) 520 may store one or more data storage systems 524 configured to store data structures and other data objects. Additionally, the software applications 526 stored on the computer 500 may include one or more client applications, services, and/or other software components. For example, for servers 110, application(s) 526 may include client applications 140, the clustering component 114 and/or other software components described in reference to FIG. 1. For a team device of team devices 150, the applications 526 may include the applications that access and use the cluster-based tools and data 151.

Figure 6:
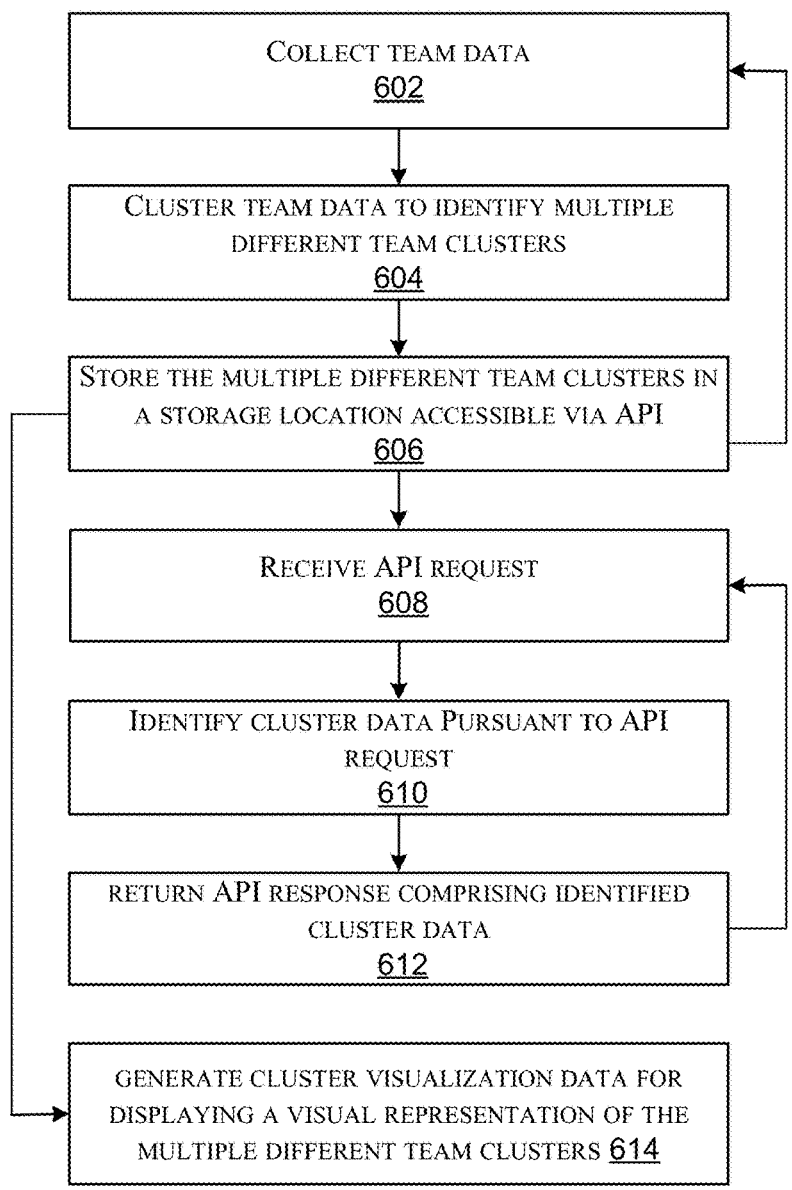
FIG. 6 is a flow diagram illustrating an example process performed by computing equipment to cluster team data and make the resulting team cluster information available via an API, in accordance with one or more examples of the present disclosure.

FIG. 6 is a flow diagram illustrating an example process performed by computing equipment to cluster team data and make the resulting team cluster information available via an API, in accordance with one or more examples of the present disclosure. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 6 can be performed by the servers 110 illustrated in FIG. 1. FIG. 6 generally comprises three groups of operations. The first group includes operations 602, 604 and 606 and provides for collecting team data, generating team clusters, and storing the team clusters. Operations 602, 604 and 606 can be repeated according to a first cycle that can be based on, e.g., availability of new team data that can potentially result in modifications to the team clusters.

The second group includes operations 608, 610 and 612 and provides for using a cluster API to access the team cluster data generated according to operations 602, 604 and 606. Operations 608, 610 and 612 can be repeated according to a second cycle that can be repeated each time an application accesses the cluster API.

The third group includes operation 614 and provides for generating cluster visualization data for displaying visualizations of team cluster data generated according to operations 602, 604 and 606. Operation 614 can be repeated according to the first cycle so that cluster visualization data is updated in response to team cluster data updates.

Operation 602 comprises "collect team data." For example, the data collector 111 can collect a variety of different team data 101, 102, 103, . . . team data N from a variety of different team data sources 100, and can store the team data 101, 102, 103, . . . team data N in aggregated team data 112. In some embodiments, as illustrated in FIG. 2, operation 602 can comprise retrieving, by a second group of computing devices (the second network 220), the team data 101, 102, 103, . . . team data N from a first group of computing devices (the second network 220). The team data can comprise ECRM data or any other data associated with different teams. In some embodiments, the ECRM data can be associated with teams comprising different agent teams at different locations and can include, inter alia, opportunities available to each team, opportunity channels associated with the opportunities, and opportunity ages associated with the opportunities.

Operation 604 comprises, "cluster team data to identify multiple different team clusters." At 604, one or more computing devices such as servers 110 can use clustering component 114 to cluster the aggregated team data 112 in order to identify multiple different team clusters 121, 122, . . . cluster N. The team data stored in aggregated team data 112 can comprise multiple different variables applicable to multiple different teams. The clustering component 114 can use a machine learning based clustering technique to produce team clusters 121, 122, . . . cluster N. Each of the multiple different team clusters 121, 122, . . . cluster N can identify a different group of the multiple different teams.

In some embodiments, the aggregated team data 112 can be preprocessed to prepare for operations of the clustering component 114. For example, the multiple different variables included in the aggregated team data 112 can be organized according to multiple different features, wherein the different features can comprise different groups of the variables. The multiple different variables can include a large number of variables, e.g., one hundred (100) or more different variables, and different teams of the multiple different teams can be associated with different values for each of the 100 or more different variables.

In some embodiments, operation 604 can include performing the clustering of the team data by a second group of computing devices (the second network 220), as illustrated in FIG. 2.

While a variety of different clustering techniques can be used at operation 604, some embodiments can advantageously use a centroid-based clustering technique as the machine learning based clustering technique. In particular, a k-means clustering technique can be advantageous for clustering team data in some embodiments, as described herein.

Operation 606 comprises, "store the multiple different team clusters in a storage location accessible via API." For example, the servers 110 can be configured to store the multiple different team clusters 121, 122, . . . cluster N in a team clusters 120 storage location that is accessible via the cluster API 130. In some embodiments, the storing of the multiple different team clusters 121, 122, . . . cluster N can be performed by a first group of computing devices, e.g., the first network 210) illustrated in FIG. 2. In some embodiments, the storing of the multiple different team clusters 121, 122, . . . cluster N in a storage location accessible via API can be performed by a first group of computing devices, e.g., the first network 210 illustrated in FIG. 2. The storing can be orchestrated by a cluster object loader 230 using team clusters 120 initially stored in the second network 220 as illustrated in FIG. 2.

Operations 608, 610, and 612 comprise, "receive API request" at 608, "identify cluster data pursuant to API request" at 610, and "return API response comprising identified cluster data" at 612. For example, at 608, the servers 110 can be configured to receive, at cluster API 130, API requests generated by applications 140. At 610, the servers 110 can be configured to identify cluster data of team clusters 120 pursuant to the API request received at 608. At 612, the servers 110 can be configured to return, to the applications 140 via cluster API 130, an API response comprising identified cluster data from team clusters 120.

The API request received at 608 can comprise any request for information included in team clusters 120. For example, in some embodiments, the API request can comprise a team identification that identifies a team of the multiple different teams, and a request to identify which of the team clusters 121, 122, . . . cluster N includes the identified team. In response to such an API request, at 610, the cluster API 130 can be configured to identify a team cluster, e.g., team cluster 121, of the multiple different team clusters 120, wherein the team cluster 121 comprises the team identification received via the API request. At 612, the cluster API 130 can be configured to return, in response to the API request, an API response comprising a team cluster identification of the team cluster 121.

For example, the API request can be received, e.g., from a workflow generator 143 configured to generate a workflow for a team identified by the team identification in the API request. The workflow can be based on a team cluster, e.g., cluster 121, identified by the team cluster identification returned by the cluster API 130.

In another example, the API request can be received, e.g., from a UI generator 142 configured to generate a UI for the team identified by the team identification in the API request. The UI can be based on the team cluster, e.g., cluster 121, identified by the team cluster identification returned by the cluster API 130.

Another example type of API request can comprise a team cluster identification that identifies a team cluster, e.g., team cluster 122 of the multiple different team clusters 120. In response to receiving such an API request from applications 140 at operation 608, the cluster API 130 can be configured to identify, at 610, team identifications of teams in the team cluster 122, i.e., identify teams in a group of multiple different teams associated with the team cluster 122. At 612, the cluster API 130 can be configured to return to applications 140 in response to the API request an API response comprising the team identifications of the teams in the group of the multiple different teams associated with the team cluster 122.

For example, the API request can be received, e.g., from a beginning of day priority generator included in applications 140 and configured to generate at least one beginning of day priority for the teams in the group of the multiple different teams associated with the team cluster 122. The beginning of day priority generator can be configured to provide the beginning of day priority to teams of the team cluster 122 identified in the API response.

In another example, the API request can be received, e.g., from a report generator 141 configured to generate reports for the teams in the group of the multiple different teams associated with the team cluster 122. The report generator 141 can be configured to provide the reports to teams of the team cluster 122 identified in the API response.

In another example, the API request can be received, e.g., from a cluster visualization generator included in applications 140 and configured to generate cluster visualization data for displaying a visual representation of the multiple different team clusters included in team clusters 120. The cluster visualization generator can be configured to generate the cluster visualization data based on teams of the team cluster 122, as well as based on teams of other team clusters 121 . . . team cluster N identified in the API response.

FIG. 6 also illustrates an example operation 614, comprising, "generate cluster visualization data for displaying a visual representation of the multiple different team clusters." For example, in some embodiments, the applications 140 can include a cluster visualization generator configured to use the cluster API 130 in connection with generating cluster visualization data. In other embodiments, such as illustrated in FIG. 3, cluster visualization data 341 can be generated and stored at a separate network (fourth network 340) that comprises a cluster visualization dashboard 342. The cluster visualization data 341 can be generated using the cluster API 130 in the first network 210 as well as team clusters 120 stored at the second network 220.

Figure 7:
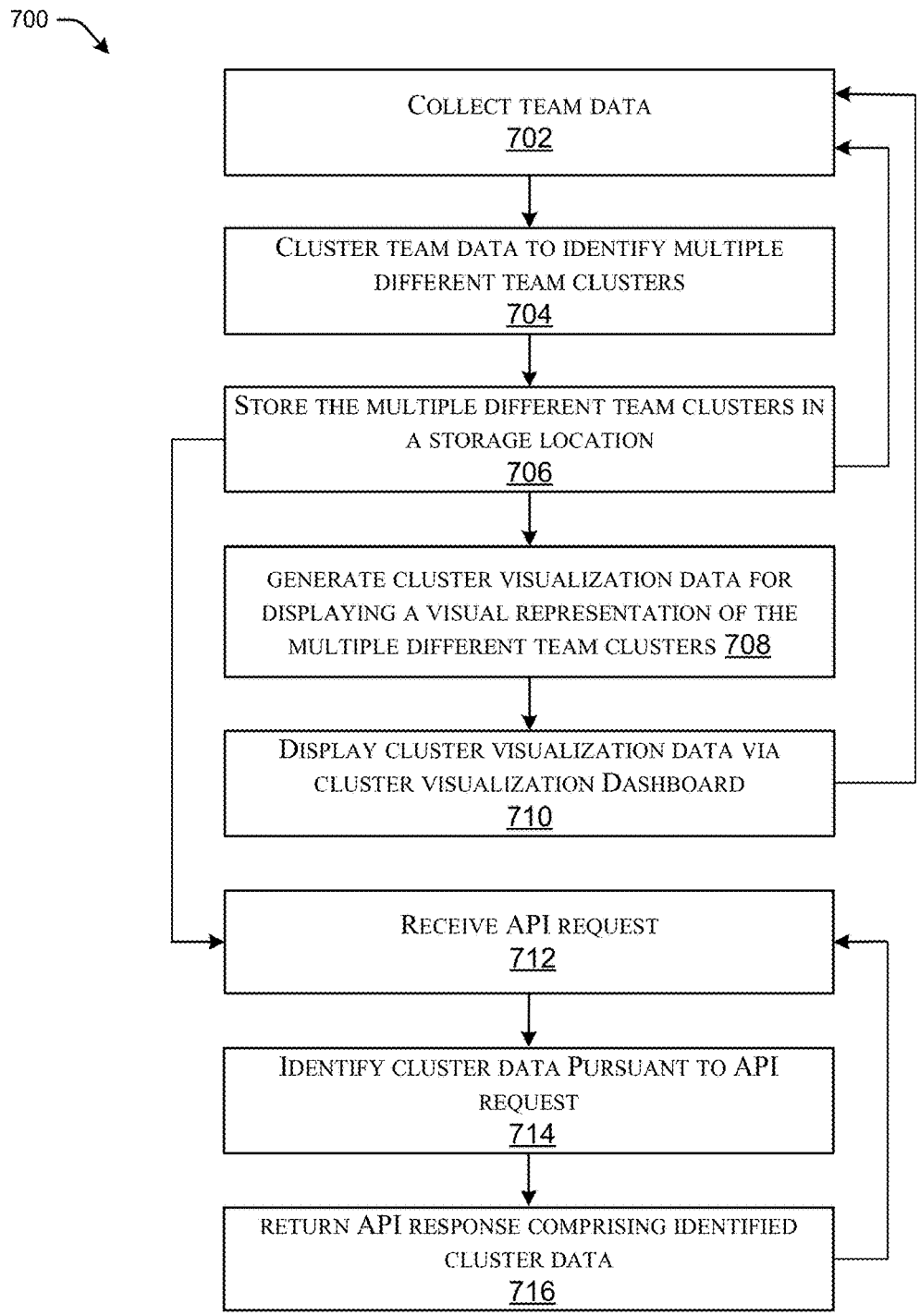
FIG. 7 is a flow diagram illustrating an example process performed by computing equipment to cluster team data, generate cluster visualization data based on the resulting team cluster information, and make the cluster visualization data available via a cluster visualization dashboard, in accordance with one or more examples of the present disclosure.

FIG. 7 is a flow diagram illustrating an example process performed by computing equipment to cluster team data, generate cluster visualization data based on the resulting team cluster information, and make the cluster visualization data available via a cluster visualization dashboard, in accordance with one or more examples of the present disclosure. The blocks of the illustrated method represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by the servers 110 illustrated in FIG. 1. FIG. 7 generally comprises three groups of operations. The first group includes operations 702, 704 and 706 and provides for collecting team data, generating team clusters, and storing the team clusters. Operations 702, 704 and 706 can be repeated according to a first cycle that can be based on, e.g., availability of new team data that can potentially result in modifications to the team clusters.

The second group includes operations 708 and 710 and provides for generating cluster visualization data and displaying visualizations of team cluster data generated according to operations 702, 704 and 706. Operations 708 and 710 can optionally be repeated according to the first cycle so that cluster visualization data is updated in response to team cluster data updates.

The third group includes operations 712, 714 and 716 and provides for using a cluster API to access the team cluster data generated according to operations 702, 704 and 706. Operations 708, 710 and 712 can be repeated according to a third cycle that can be repeated each time an application accesses the cluster API.

Operation 702 comprises "collect team data." Operation 702 can be configured similarly to operation 602 described with reference to FIG. 6. Operation 704 comprises, "cluster team data to identify multiple different team clusters." Operation 704 can be configured similarly to operation 604 described with reference to FIG. 6.

Operation 706 comprises, "store the multiple different team clusters in a storage location." Operation 706 can be configured similarly to operation 606 described with reference to FIG. 6, however, in some embodiments, the storage location need not necessarily be accessible by the cluster API 130 as described with reference to FIG. 6. Instead, the servers 110 can be configured to store the multiple different team clusters 121, 122, . . . cluster N in one or more team clusters 120 storage locations that are accessible via fourth network 340, illustrated in FIG. 3.

Operation 708 comprises, "generate cluster visualization data for displaying a visual representation of the multiple different team clusters." For example, a cluster visualization data generator among the applications 140 can be configured to generate cluster visualization data 341 based on the multiple different team clusters in the team clusters 120 storage location(s), and store the cluster visualization data 341 in the fourth network 340 or otherwise in a location accessible by the cluster visualization dashboard 342.

Operation 710 comprises, "display cluster visualization data via cluster visualization dashboard." For example, the cluster visualization dashboard 342 can be configured to access and display the cluster visualization data 341 in a variety of different configurations. FIG. 8 illustrates one example configuration for displaying the cluster visualization data 341, and other display configurations can be made with the benefit of this disclosure.

Operations 702-710 can be repeated according to a repeating update process in some embodiments. The repeating update receiving new team data for collection according to operation 702, merging the new team data with the previously collected team data, resulting in updated team data which can be included in aggregated team data 112, re-clustering the updated team data by the clustering component 114 in order to identify multiple different updated team clusters, which can be stored among team clusters 120, regenerating, based on the multiple different updated team clusters 120 in the storage location, the cluster visualization data 341 resulting in updated cluster visualization data 341, and displaying the updated cluster visualization data 341 via the cluster visualization dashboard 342.

The operations of FIG. 7 can also include operations 712, 714, and 716 in some embodiments, in order to also make cluster information accessible via a cluster API 130. To support operations 712, 714, and 716, the servers 110 can be configured to store the multiple different team clusters 121, 122, . . . cluster N in a team clusters 120 storage location that is accessible via the cluster API 130. In some embodiments, the storing of the multiple different team clusters 121, 122, . . . cluster N can be performed by a first group of computing devices, e.g., the first network 210 illustrated in FIG. 2. In some embodiments, the storing of the multiple different team clusters 121, 122, . . . cluster N in a storage location accessible via API can be performed by a first group of computing devices, e.g., the first network 210 illustrated in FIG. 2. The storing can be orchestrated by a cluster object loader 230 using team clusters 120 initially stored in the second network 220 as illustrated in FIG. 2.

Operations 712, 714, and 716 comprise, "receive API request" at 712, "identify cluster data pursuant to API request" at 714, and "return API response comprising identified cluster data" at 714. The operations 712, 714, and 716 can be similar to operations 608, 610, and 612, described herein with reference to FIG. 6.

FIG. 8 illustrates an example user interface (UI) generated as part of a cluster visualization dashboard, in accordance with one or more examples of the present disclosure. The example UI 800 comprises a cluster selection element 802, a cluster data display 804, and a visual guide 806. The UI 800 is one example of a UI that can be generated, e.g., by a cluster visualization dashboard 342 such as illustrated in FIG. 3.

In an example according to FIG. 8, a team cluster can be selected via the cluster selection element 802. The UI 800 can be configured to receive the cluster selection and to dynamically modify the cluster data display 804 to provide data corresponding to the selected cluster. In FIG. 8, the cluster data display 804 is configured as dynamic a map comprising representations of different proportions of the selected cluster, e.g., cluster 2, in different map regions. In order to generate the map, cluster visualization data can include geographic location information corresponding to each team. The geographic location information can be derived, e.g., from the team clusters 120, in a configuration such as illustrated in FIG. 3.

The visual guide 806 is an example visual guide to that describes the data presented via the cluster data display 804. In the illustrated example, the visual guide 806 shows different colors or shades that correspond to different proportions of the selected cluster in the different map regions.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
    performing, based on a clustering technique and by one or more computing devices, clustering of team data in order to identify multiple different team clusters, wherein:
        the team data comprises multiple different variables applicable to multiple different teams, and
        each team cluster of the multiple different team clusters comprises a different group of the multiple different teams;
    storing, by the one or more computing devices, the multiple different team clusters in a storage location and in a format that enables access via an application programming interface (API) the API being configured to access the storage location and generate data associated with each team cluster of the multiple different team clusters;
    receiving, by the one or more computing devices and from an application, an API request comprising a team identification that identifies a team of the multiple different teams;
    identifying, by the one or more computing devices, using the API and in response to the API request, a team cluster of the multiple different team clusters, wherein the team cluster comprises the team identification associated with a particular group of the multiple different teams;
    generating, by the one or more computing devices, a message comprising:
        an API response including cluster data including the team identification of the team cluster; and
        a customized tool for the team cluster; and
    sending, by the one or more computing devices, the message to the application to enable the application to utilize the customized tool and the cluster data.

2. The method of claim 1, wherein the team data comprises electronic customer relationship management (ECRM) data.

3. The method of claim 1, wherein the multiple different variables are organized according to multiple different features, wherein at least one of the multiple different features comprises a group of the multiple different variables.

4. The method of claim 1, wherein the multiple different variables include one hundred (100) or more different variables, and wherein different teams of the multiple different teams are associated with different values for each of the different variables.

5. The method of claim 1, wherein performing the clustering comprises using a machine learning based clustering technique including a centroid-based clustering technique.

6. The method of claim 5, wherein the centroid-based clustering technique comprises a k-means clustering technique.

7. The method of claim 1, wherein the API request is received from a workflow generator of the application executing on the one or more computing devices and configured to generate a customized workflow for the team identified by the team identification, and the customized workflow is generated based on the team cluster identified by the team identification.

8. The method of claim 1, wherein the API request is received from a user interface generator of the application executing on the one or more computing devices and configured to generate customized a user interface for the team identified by the team identification, and the customized user interface is generated based on the team cluster identified by the team identification.

9. The method of claim 1, further comprising generating, by the one or more computing devices, cluster visualization data corresponding to the multiple different team clusters.

10. The method of claim 1, further comprising:
retrieving, by a second group of the one or more computing devices, the team data from a first group of the one or more computing devices;
clustering the team data with the second group of the one or more computing devices; and
storing of the multiple different team clusters with the first group of the one or more computing devices.

11. A system comprising one or more computing devices, the system comprising:
one or more processors; and
one or more non-transitory computer-readable media storing computer-executable instructions that, when executed by the one or more processors, cause the one or more processors to perform operations comprising:
using a machine learning based clustering technique to cluster team data in order to identify multiple different team clusters, wherein the team data comprises multiple different variables applicable to multiple different teams, and wherein each team cluster of the multiple different team clusters comprises a different group of the multiple different teams;
storing the multiple different team clusters in a storage location and in a format that enables access via an application programming interface (API) configured to access and generate cluster data associated with each team cluster of the multiple different team clusters;
receiving an API request comprising a team cluster identification that identifies a team cluster of the multiple different team clusters;
identifying, in response to the API request and using the API, team identifications of teams in a group of the multiple different teams associated with the team cluster;
generating, by the one or more computing devices:
an API response comprising data including team identifications of the teams in the group of the multiple different teams associated with the team cluster, and
one or more tools or workflows customized for the teams; and
outputting, by the one or more computing devices, in response to the API request, a message including the API response and the one or more tools or workflows.

12. The system of claim 11, wherein the team data comprises electronic customer relationship management (ECRM) data comprising opportunities, opportunity channels associated with the opportunities, and opportunity ages associated with the opportunities, and wherein the team data is associated with teams comprising different agent teams at different locations.

13. The system of claim 11, wherein the API request is received from a beginning of day priority generator configured to generate at least one beginning of day priority for the teams in the group of the multiple different teams associated with the team cluster.

14. The system of claim 11, wherein the API request is received from a report generator configured to generate reports for the teams in the group of the multiple different teams associated with the team cluster.

15. The system of claim 11, wherein the API request is received from a cluster visualization generator configured to generate cluster visualization data for displaying a visual representation of the multiple different team clusters.

16. One or more non-transitory computer-readable media storing instructions executable by a processor, wherein the instructions, when executed by the processor, cause the processor to perform operations comprising:
using a machine learning based clustering technique to cluster team data in order to identify multiple different team clusters, wherein the team data comprises multiple different variables applicable to multiple different teams, and wherein each team cluster of the multiple different team clusters comprises a different group of the multiple different teams;
storing the multiple different team clusters in a storage location;
generating, based on the multiple different team clusters in the storage location, cluster visualization data that renders a customized visual representation of the multiple different team clusters, features associated with each cluster within the multiple different team clusters, and selectable elements to manipulate or view the features or different groups; and
displaying the cluster visualization data via a cluster visualization dashboard.

17. The one or more non-transitory computer-readable media of claim 16, wherein the operations further comprise:
performing a repeating update process comprising:
receiving new team data;
merging the new team data with the team data, resulting in updated team data;
re-clustering the updated team data in order to identify multiple different updated team clusters;
storing the multiple different updated team clusters in the storage location;
regenerating, based on the multiple different updated team clusters in the storage location, the cluster visualization data, resulting in updated cluster visualization data; and
displaying the updated cluster visualization data via the cluster visualization dashboard.

18. The one or more non-transitory computer-readable media of claim 16, wherein the storage location is a first storage location, and wherein the operations further comprise:
storing the multiple different team clusters in a second storage location, wherein the second storage location is accessible via an application programming interface (API);
receiving an API request via the application programming interface, wherein the API request comprises a team identification that identifies a team of the multiple different teams;
identifying, in response to the API request, a team cluster of the multiple different team clusters, wherein the team cluster comprises the team identification; and
returning, in response to the API request, an API response comprising a team cluster identification of the team cluster.

19. The one or more non-transitory computer-readable media of claim 16, wherein the machine learning based clustering technique comprises a k-means clustering technique.

20. A system for providing team data for clusters, the system comprising:
means for using a machine learning based clustering technique to cluster the team data in order to identify multiple different team clusters, wherein the team data comprises multiple different variables applicable to multiple different teams, and wherein each team cluster of the multiple different team clusters comprises a different group of the multiple different teams;

means for storing the multiple different team clusters in a storage location;

means for generating, based on the multiple different team clusters in the storage location, customized cluster visualization data that enables a visual representation of data associated with at least one team cluster of the multiple different team clusters and tools customized for the at least one team cluster; and means for displaying the customized cluster visualization data via a cluster visualization dashboard.

* * * * *